No. 664,931. Patented Jan. 1, 1901.
W. R. DONALDSON.
VEHICLE TIRE.
(Application filed May 29, 1900.)
(No Model.) 2 Sheets—Sheet 1.

Witnesses
G. S. Elliott.
James R. Mansfield.

Inventor
William R. Donaldson,
By:
Alexander & Dowell Attorneys

No. 664,931. Patented Jan. 1, 1901.
W. R. DONALDSON.
VEHICLE TIRE.
(Application filed May 29, 1900.)
(No Model.) 2 Sheets—Sheet 2.
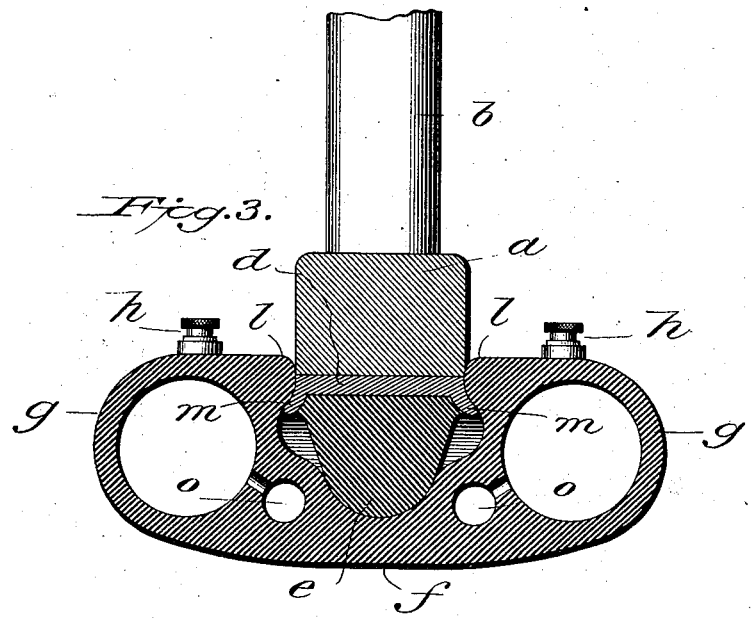
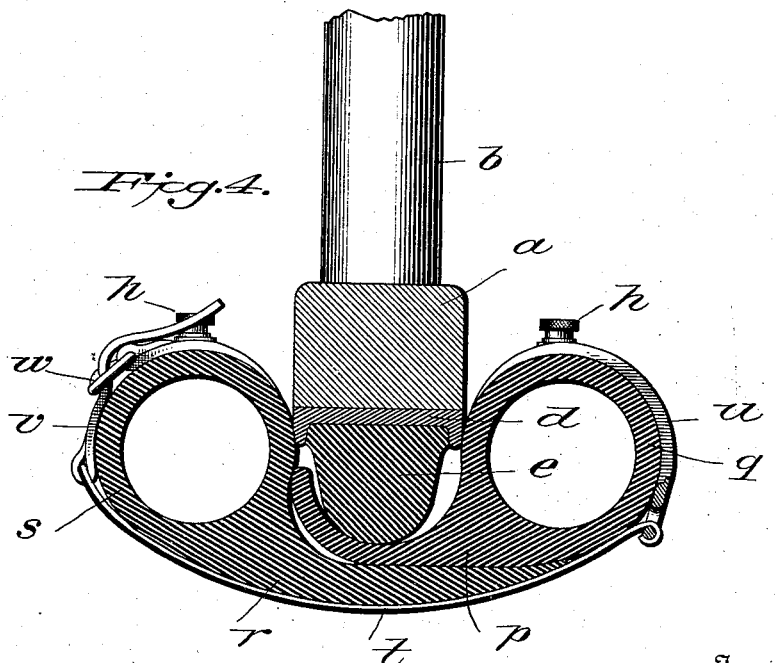

UNITED STATES PATENT OFFICE.

WILLIAM R. DONALDSON, OF CHICAGO, ILLINOIS.

VEHICLE-TIRE.

SPECIFICATION forming part of Letters Patent No. 664,931, dated January 1, 1901.

Application filed May 29, 1900. Serial No. 18,433. (No model.)

*To all whom it may concern:*

Be it known that I, WILLIAM R. DONALDSON, of Chicago, in the county of Cook and State of Illinois, have invented certain new and useful Improvements in Vehicle-Tires; and I hereby declare that the following is a full, clear, and exact description thereof, reference being had to the accompanying drawings, which form part of this specification.

This invention is an improvement in vehicle-tires; and its object is to provide a preferably removable sand or mud tire for vehicle-wheels which is applicable to ordinary vehicle-wheels to increase the breadth of the tread thereof when traveling over soft, muddy, or sandy ground.

The invention will be clearly understood from the following description, taken in connection with the accompanying drawings, and the substance of the application is set forth in the claims following the description.

Figure 1:
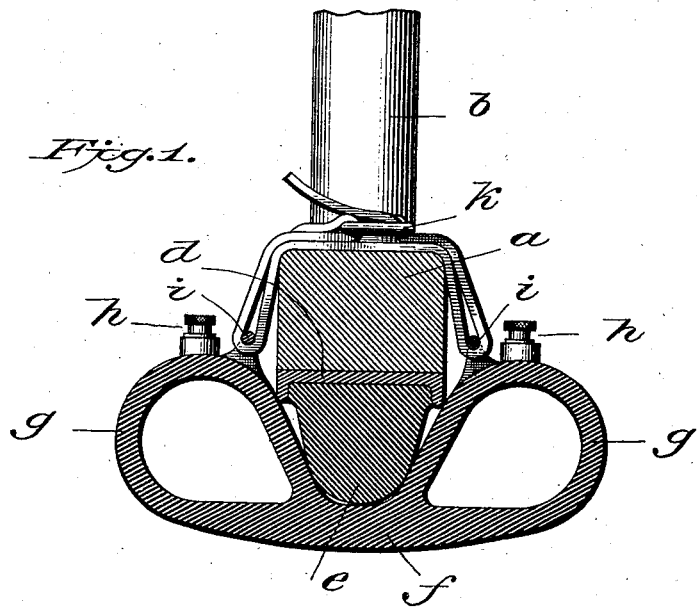
Figure 2:
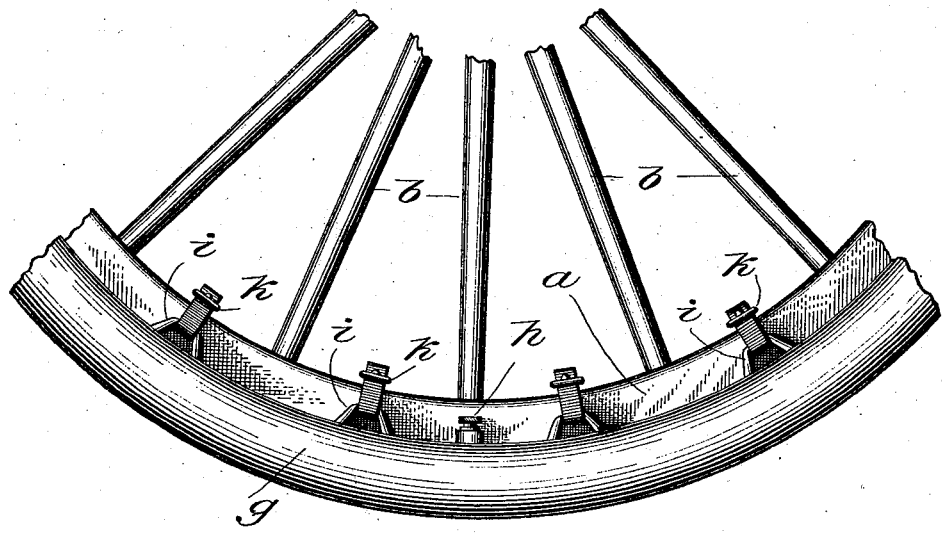

In the drawings, Figure 1 is an enlarged transverse section through the felly, tread, and tire of a wheel and through what I now consider the preferred form of sand or mud tire, which is removably applied thereto. Fig. 2 is a detail side view of Fig. 1. Figs. 3 and 4 are views similar to Fig. 1, showing modifications of the auxiliary sand or mud tires.

Referring to the drawings, $a$ designates the felly of an ordinary wheel, $b$ one of the spokes, $d$ the grooved metallic tire-band, and $e$ a cushion or pneumatic tire of ordinary construction, such as are commonly in use. Such wheels and tires are well adapted for service on paved streets and hard roads; but owing to the narrowness of their tread they cut deeply into sand and soft ground. In order to adapt the vehicles for use over soft ground, it has been proposed to provide them with cushion or pneumatic tires of large diameter; but these latter are very expensive and troublesome, and while advantageous in sand they are not so desirable on hard roads.

In order to enable the vehicles to be used in soft, muddy, or sandy ground, I provide an auxiliary sand or mud tire, which is applied to the rim of the wheel over the ordinary tire and is preferably detachably fastened to the wheel in any suitable manner.

In Fig. 1 the auxiliary tire is shown as consisting of a flexible or resilient band or annulus $f$, adapted to fit over the tire $e$. On the opposite edges of this band are circumferential cushions $g$, which fit on each side of the tire $e$ and greatly increase the width of the tread of the wheel. These cushions $g$, if desired, may be made hollow, so as to form pneumatic cushions, and, as shown, they are provided with air-filling valves $h$. When the auxiliary tire is not to be used, the cushion $g$ can be deflated and the tire can be collapsed into small space. When it is to be used, it is applied over the tire $e$ of the wheel, as indicated, and then the cushions (if pneumatic) may be inflated. The auxiliary tire imparts a firm but resilient and broad bearing-surface or tread to the wheel, which will enable it to travel easily over soft sandy roads. The auxiliary tire may be detachably secured to the wheel in any desired manner, various ways being illustrated in the drawings.

In Figs. 1 and 2, for example, the cushions $g$ are provided with eyes $i$, through which are passed leather straps provided with buckles $k$, by which they can be readily fastened over the felly, so as to hold the auxiliary tire, as shown.

In Fig. 3 the construction is substantially as already described, with the exception that the opposite pneumatic cushions $g$ are provided with inwardly-projecting shoulders $l$, which when the cushions are inflated will bind closely against the felly $d$, which latter may be provided with recesses to receive the lobes, or, as shown, the flanges of the tire-band $d$ may be bent outwardly to form lips $m$, engaged by the shoulders $l$ to secure the auxiliary tire in place. For the purpose of lightness the auxiliary tire may also be provided with annular passages $o$, which can be inflated with air, if desired.

Instead of one band provided with two cushions I may employ two bands $p$ and $r$, as shown in Fig. 4, respectively provided with single cushions $q$ and $s$. In applying these to a wheel band $p$ is first laid over the tire $e$. Then the band $r$ is lapped over the band $p$. The bands are then fastened together by suitable means. As shown, the metal straps $t$ are used, one end of each of such straps being fastened to the loop $u$ on cushion $q$, and its other end is fastened by means of a strap $v$ to a buckle $w$ on cushion $s$, so that the parts will be securely held in place.

As various changes may be made in the form and construction of the auxiliary tires, and particularly in the fastening devices thereof, within the scope of my invention, I do not limit myself to the specific constructions herein shown.

Having thus described my invention, what I claim as new is—

1. The combination with a vehicle-wheel, of a detachable mud or sand tire wider than the wheel-tire and provided with opposite cushions projecting on opposite sides of the wheel-tire, substantially as described and for the purpose set forth.

2. The combination of a vehicle-wheel with a detachable sand or mud tire adapted to fit around the wheel and provided with inflatable cushions at each side, substantially as described.

3. The combination of a vehicle-wheel, with a sand or mud band adapted to fit around the wheel and provided with cushions at each side of the wheel-tire, and means for detachably fastening the band in place around the wheel-tire, substantially as described.

4. The combination of a vehicle-wheel, with a detachable sand or mud band therefor adapted to fit around the wheel and provided with inflatable cushions to fit on opposite sides of the wheel-tire, and means for fastening the band in place, substantially as described.

5. The herein-described auxiliary tire for vehicle-wheels, consisting of a collapsible and removable band adapted to fit over the wheel-tire and detachably secured thereto and having annular cushions on its edges adapted to fit on opposite sides of the wheel-tire.

6. The herein-described detachable pneumatic tire for vehicle-wheels consisting of a collapsible band adapted to fit over a wheel-tire and having annular inflatable cushions on its edges, substantially as described.

7. The herein-described detachable sand-band or auxiliary tire for vehicle-wheels consisting of a collapsible band adapted to fit over a wheel-tire and increase the width of its tread, and means for securing said auxiliary tire to a vehicle-wheel, substantially as described.

8. The herein-described detachable sand-band or pneumatic tire for vehicle-wheels consisting of a collapsible band adapted to fit over a wheel and having opposite annular inflatable cushions adapted to fit against opposite sides of a wheel-tire, and means for detachably fastening the same to a wheel.

9. The combination with a vehicle-wheel, of an auxiliary flexible resilient tire detachably secured to the tire of the wheel and having opposite annular cushions adapted to project beyond and fit against opposite sides of the wheel rim or tire.

10. The combination with a vehicle-wheel, of a flexible auxiliary tire detachably secured to the wheel and having annular cushions on its edges adapted to fit against opposite sides of the wheel-rim, and means for inflating said cushions.

11. The combination with a vehicle-wheel, of a flexible resilient auxiliary tire detachably secured to the wheel and having opposite annular cushions adapted to fit against opposite sides of the wheel rim or tire, means for inflating said cushions, and means for detachably securing said auxiliary tire to the wheel, all substantially as and for the purpose set forth.

In testimony that I claim the foregoing as my own I affix my signature in presence of two witnesses.

WILLIAM R. DONALDSON.

In presence of—
  CHAS. S. POTTS,
  G. EDGAR ALLEN.